July 19, 1932.    O. LARSON    1,867,917

COMBUSTION ROTARY ENGINE

Filed March 31, 1930    5 Sheets-Sheet 1

INVENTOR:
Otto Larson.
BY
ATTORNEY.

July 19, 1932.  O. LARSON  1,867,917
COMBUSTION ROTARY ENGINE
Filed March 31, 1930  5 Sheets-Sheet 2

INVENTOR:
Otto Larson.
BY
ATTORNEY.

INVENTOR:
Otto Larson.

July 19, 1932. O. LARSON 1,867,917
COMBUSTION ROTARY ENGINE
Filed March 31, 1930 5 Sheets-Sheet 5

INVENTOR:
Otto Larson.
BY
ATTORNEY.

Patented July 19, 1932

1,867,917

UNITED STATES PATENT OFFICE

OTTO LARSON, OF ST. LOUIS, MISSOURI

COMBUSTION ROTARY ENGINE

Application filed March 31, 1930. Serial No. 440,449.

My invention relates to the rotary type of combustion engines wherein rotors are driven by impact and wherein combustion gases are utilized as the motive agent for driving the rotors.

A further object of my invention is the provision of an engine including a novel type of valve controlled combustion chamber from which the expanded gases after being ignited are liberated and directed against the blades of rotors.

Another object of the invention resides in the provision of a pair of rotors disposed on opposite sides of a ported stator and with the turbine vanes of one of the rotors being positioned closer together than the turbine vanes of the other rotor to allow for the expansion being liberated from the first mentioned rotor through the ported stator.

A further object of the invention is the provision of means for trapping and retaining a quantity of air from the compressor cylinders immediately after the combustion chambers have been charged and liberating it for passage into the combustion chambers, after explosions therein, for the purpose of scavenging the combustion chambers.

A further object of the invention is the provision of means for admitting liquid fuel under pressure in the form of a spray to the combustion chamber after the compressed air has been admitted thereto.

A further object of the invention resides in means for controlling the amount of fuel admitted to the combustion chamber.

A still further object of the invention resides in providing an exhaust chamber surrounding the power shaft from which the exhaust gases are liberated to the atmosphere.

A still further object of the invention is the provision of a combustion rotary engine which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views.

Figure 1:
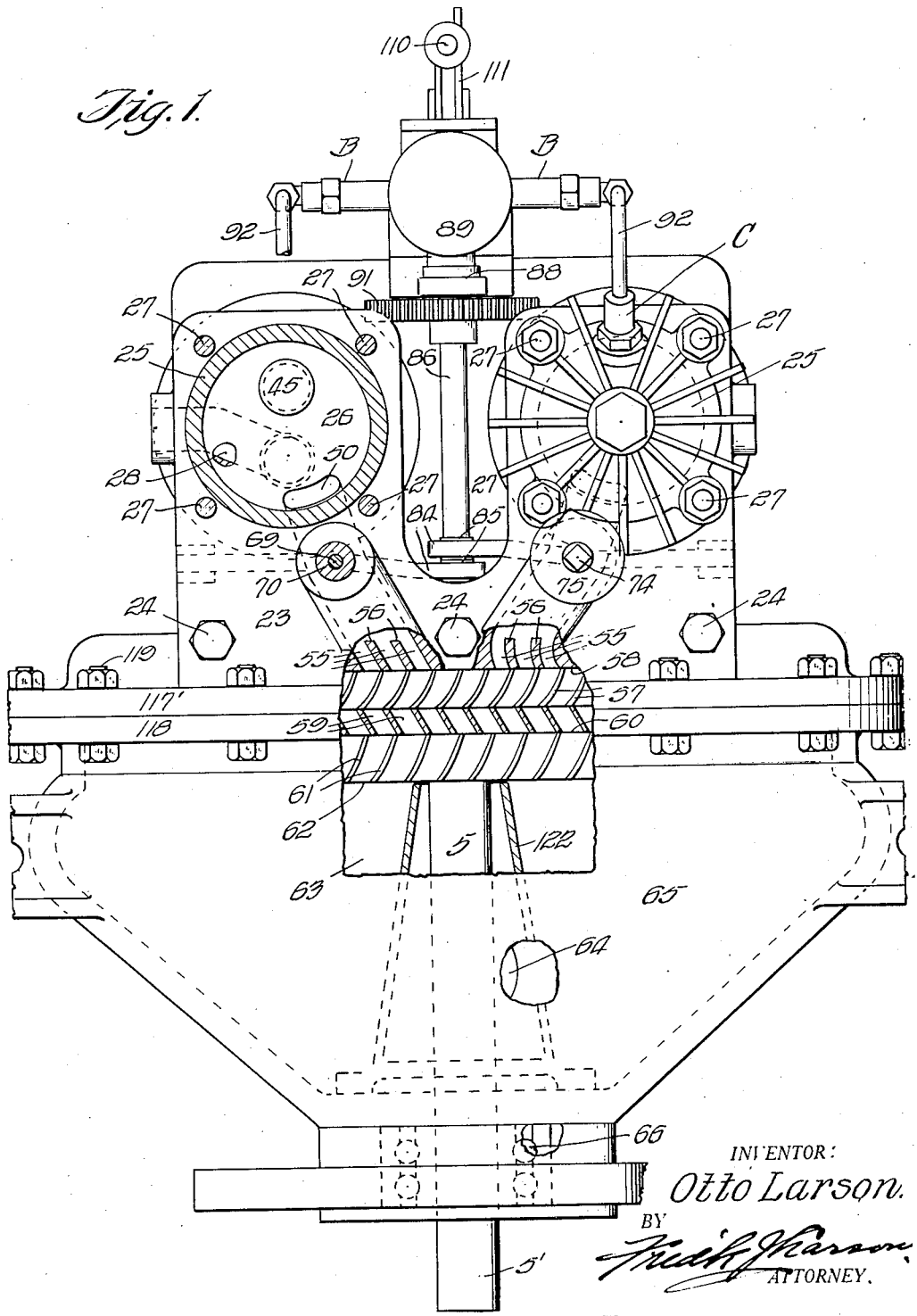
Fig. 1 is a top plan view of an engine constructed in accordance with my invention, with the head of one of the combustion chambers being removed.

Referring to the drawings, the reference numeral A designates generally the engine casing, which includes a suitable upright front end wall 1, the crank case 2, a suitable base member 3 supported by the crank case 2 and the end wall 1, and a cover plate 4. A suitable power or drive shaft 5 is journaled in suitable bearings 6 and 7 carried by the front wall 1 and the crank case 2, respectively. A suitable worm 8 is fixed to the drive shaft 5 within the casing and it meshes with a suitable worm gear 9 fixed to a suitable shaft 10, which shaft is rotatably mounted in suitable bearings 11 carried by brackets 12 which are supported by the front end wall 1 of the casing A and directed into the crank case of the engine. The ends of the shaft 10 are each provided with a fixed disc 13 from each of which is directed a crank pin 14 journaled in a suitable bearing 15 carried by the lower ends of a pair of connecting rods 16.

Figure 2:
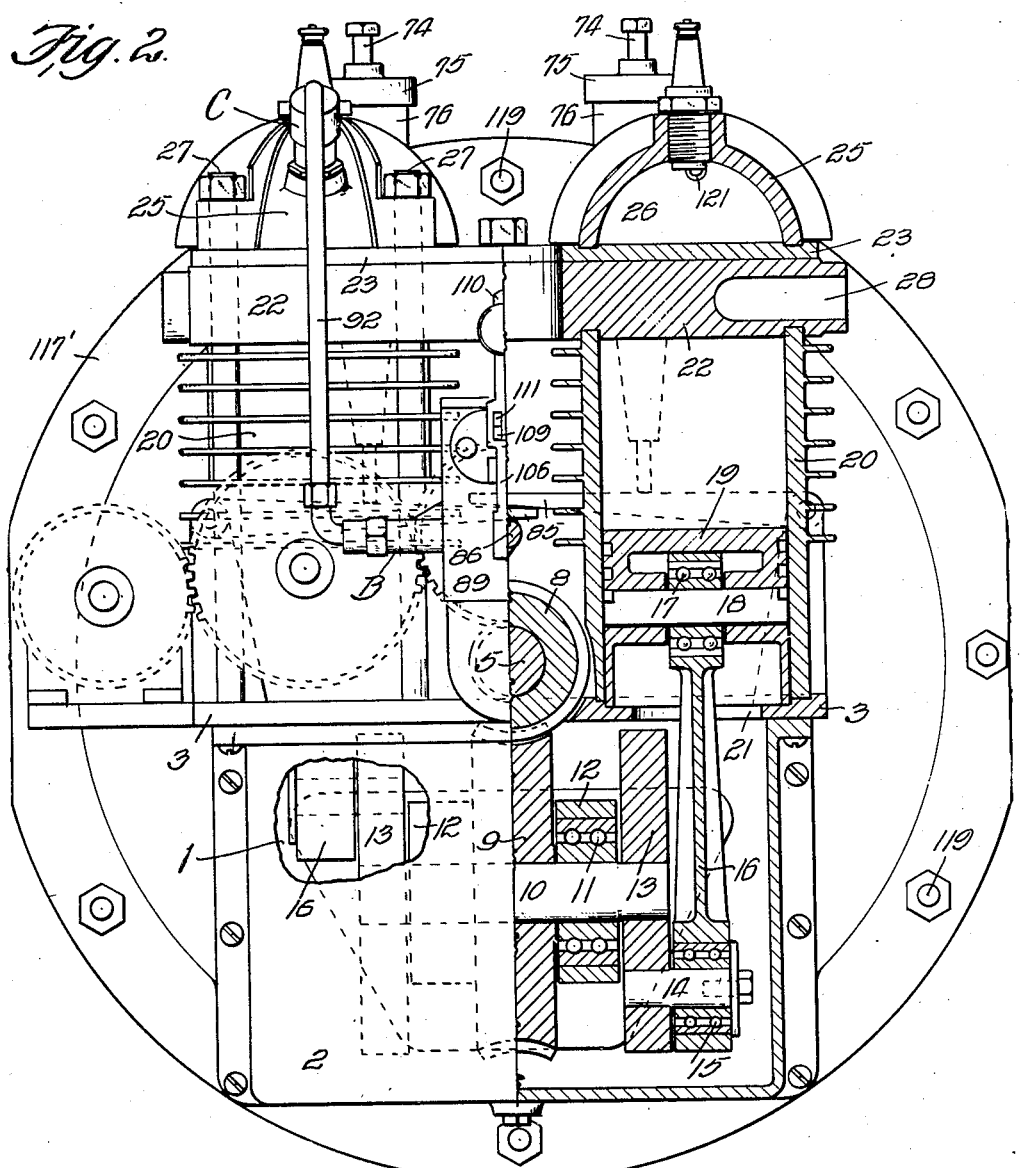
Fig. 2 is a view showing the engine partly in front elevation and partly in sectional elevation.

The connecting rods 16 are each provided at their upper ends with a suitable bearing 17 within each of which is journaled a wrist pin 18 carried by the pistons 19 which pistons are reciprocable within the two pump or compressor cylinders 20 supported at their lower ends by the base plate 3 and surrounding openings 21 therein through which the connecting rods pass, as clearly shown in Fig. 2.

A suitable cylinder head member 22 is mounted to close the upper end of each pump cylinder 20 and is also supported at its front edge by the casing wall 1. Mounted upon the cylinder head member 22 is a plate like member 23 which completes the cylinder head. The cylinder head in general is secured to the front wall of the casing by means of suitable fastening devices 24, as shown in Fig. 1.

Figure 3:
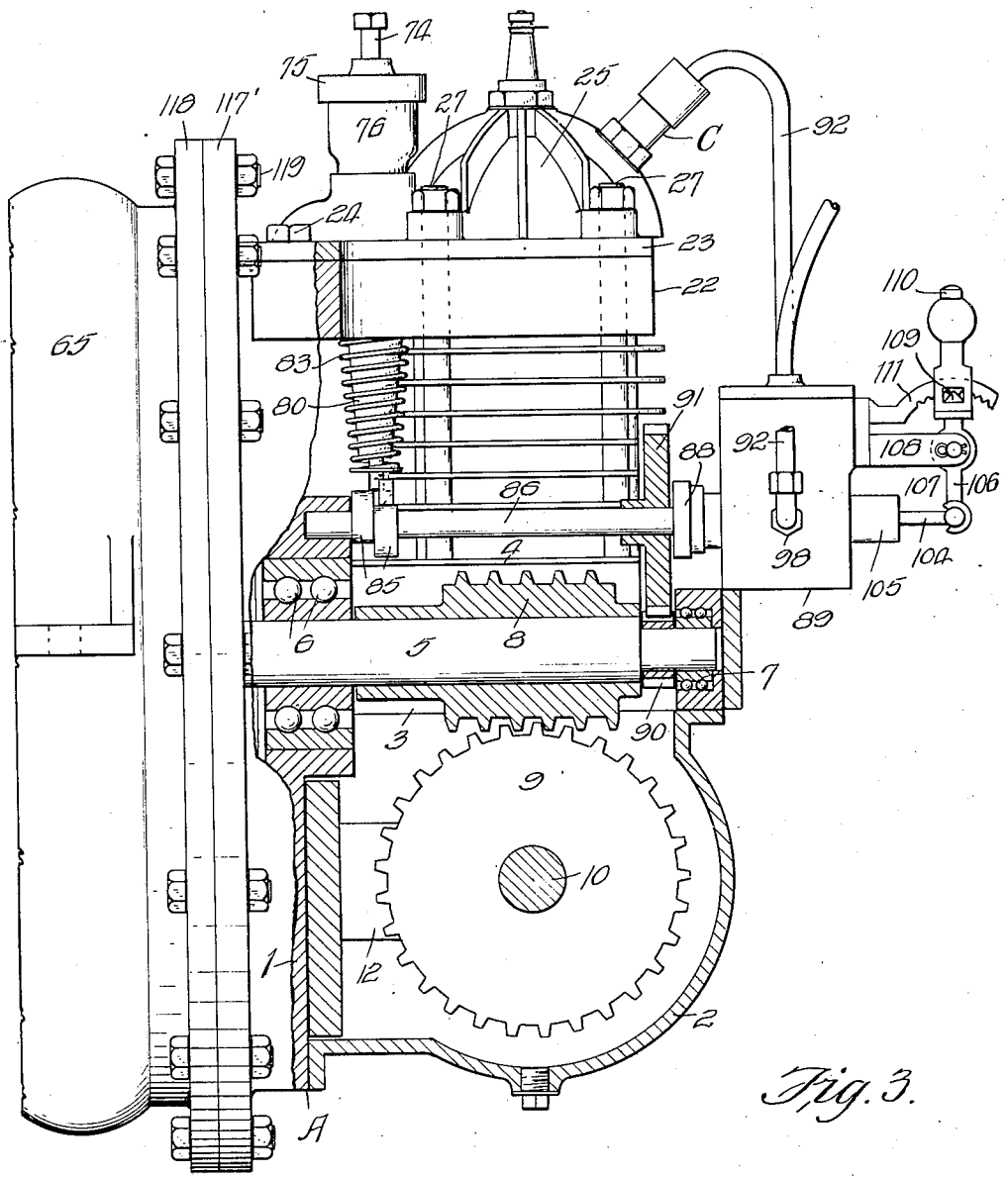
Fig. 3 is a view showing the engine partly in side elevation and partly in sectional elevation.

Positioned upon the plate like member 23 of the cylinder head over each pump cylinder 20 is a dome shaped head member 25 to provide a combustion or explosion chamber 26 above each pump cylinder 20, as clearly shown in Fig. 3. Each dome shaped head member 25 is secured to the plate like member 23 of the cylinder head, the cylinder head to each cylinder, and each cylinder to the base member 3 by means of a plurality of tie bolts 27 which are anchored at their lower ends in the base member 3, as will be apparent from Figs. 1 and 2.

Each cylinder head member 22 is provided with a laterally directed air intake passage 28 which terminates at its inner end in a chamber 29 which communicates with the pump cylinder through a port opening 30 provided with a valve seat 31. A valve 32 is seated upon the valve seat 31 and is provided with a valve stem 33 guided in a spider bearing 34. The valve is normally held in its closed position by means of a coiled spring 35 positioned around the valve stem between the spider bearing and a plate 36 carried by the valve stem 33 and held against upward displacement by means of a key 37. This valve opens automatically with the suction created by the downward stroke of its respective piston for admitting a charge of fresh air into the pump cylinders to be compressed by the upward stroke of each piston.

Adjacent each air intake valve 32 of each pump is a compressed air discharge valve 38 adapted to normally engage a valve seat 39 at the lower end of an air pocket or chamber 40 in cylinder head member 22 directly above each cylinder 20 for closing communication between the cylinders and their respective air pockets or chambers 40. Each valve 38 is provided with a valve stem 41 which is surrounded by means of a coiled spring 42 disposed between the valve and a spider bearing 43 for normally holding the valve in its closed position.

The upper end of each valve stem 41 has telescopic connection with a tubular valve stem 44 guided by the spider bearings 43 and having its upper end provided with a valve seat 45 adapted to normally engage a valve seat 46 of an air discharge port opening 47 which leads from each pocket or chamber 40 to its respective combustion chamber 26, as clearly shown in Fig. 3. The valve stem 38 of each pump is provided with a cross key 48 with its projecting ends engaging in a slot 49 in the wall of the tubular valve stem 44. Valve 45 is not controlled by spring tension, but is gravity and pressure controlled and free to upward movement independent of the spring controlled valve 38. Valve 45 has a dual function to perform as will be clearly pointed out hereinafter, although its one and first function is to open under air pressure with valve 38 when discharging compressed air from each pump cylinder to its respective combustion chamber, both valves automatically closing at the end of the compressing stroke of either pump piston.

It may be here mentioned, that at the end of each compression stroke of either pump piston for supplying compressed air to the combustion chambers that the air pocket or chamber 40 of each cylinder and its respective combustion chamber 26 is also filled with compressed air and held therein by the valves 38 and 45. The air corralled cannot escape through valve 45 due to the fact that there are more cubic inches of compressed air in the combustion chambers than in the air pockets of chambers 40 and it cannot escape back into the pump cylinder due to the spring controlling valve 38.

The air retained in the air pocket or chamber 40 of either pump head is utilized for scavenging purposes after each explosion and after the pressure of the burnt gases recedes in the combustion chambers. This is brought about by the fact that the air in chamber 40 is greater in pressure than the pressure of the burnt gas remaining in the combustion chamber, after having spent its force, thus allowing the air pressure in chamber 40 to open valve 45 and enter the combustion chamber, to be exhausted with the last of the burnt gases from the combustion chamber.

Each cylinder head is provided with a combustion passage 50 which communicates at its inner end with its respective combustion chamber 26 and which communicates at its outer end through two port openings designated 51 and 52 with branch outlet passages 53 and 54, respectively, which branch passages merge into a jet passage 55 formed by partitions 56 for tangentially directing the force of each explosion first against the blades 57 of a rotor 58 fixed to the power shaft 5, then through suitable passages 59 in a stator or partition member 60 against the blades 61 of the second rotor 62 fixed to the power shaft 5 as the burnt gases are further expanded, thereby utilizing all available force from each explosion created within the combustion chambers 26.

As the burnt gases are released from the second bladed rotor 62 they escape into an exhaust chamber 63 and escape through an exhaust opening 64 in the casing 65 which forms the exhaust chamber 63 around the power shaft 5. The power shaft is further supported in a suitable bearing 66 at the forward end of the exhaust casing 65 and the extended forward end 5' of the power shaft 5 may carry an airplane or marine propeller, either directly connected thereto or through a suitable reduced or advanced gear connection, not shown.

The port opening 51 of each combustion passage 50 is provided with a valve seat 67 which a valve 68 is adapted to normally engage. Each valve 68 is provided with a valve stem 69 guided by a suitable bearing 70 and provided with a head 71 against which one end of a coiled spring 72 engages. The opposite end of the spring 72 engages a plate 73 which is in contact with the end of a screw 74 carried by the removable head 75 of a casing 76 which encloses the spring 72. By means of the screw 74 the proper tension can be applied to the spring 72 for controlling the tension of the automatic valve 68 of each power unit.

The opposite port opening 52 of each combustion passage 50 is provided with a valve seat 77 which a valve 78 is adapted to normally engage. Each valve 78 is provided with a valve stem 79 guided in a valve stem sleeve 80. The lower end of each stem 79 is provided with a disc 81 held against downward displacement by means of a key 82. The lower end of a coiled spring 83 engages the disc 81 and the upper end of the coiled spring which encircles the valve stem and the valve stem sleeve engages the cylinder head member 22 so that the spring will close the valve 78. Each valve 78 is opened by means of a rocker arm 84 against which the lower end of each valve stem 79 rests.

Figure 4:
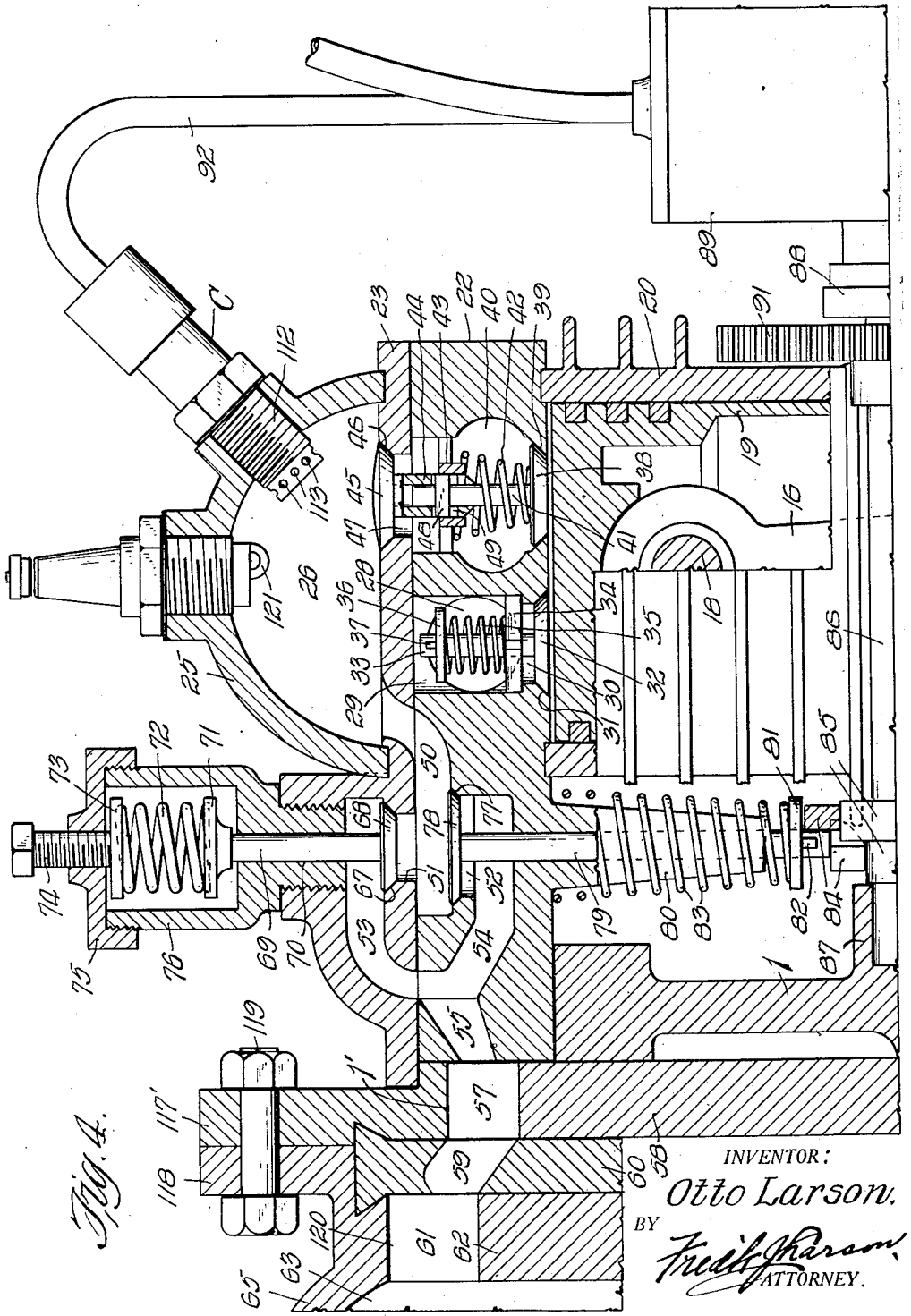
Fig. 4 is an enlarged vertical sectional view through one of the combustion chambers and the valve controlled passage leading to the rotors.

The rocker arms are actuated by means of a pair of cams 85 carried by a shaft 86 which is journaled at one end in a bearing 87 of the casing wall 1 and near its opposite end in a bearing 88 carried by the wall of a motive fuel supply tank 89 which is supported by the bearing 7, as shown in Fig. 4. The cam shaft 86 is rotated from the power shaft 5 through the medium of the gears 90 and 91 fixed to the power shaft 5 and the cam 86, respectively.

Figure 5:
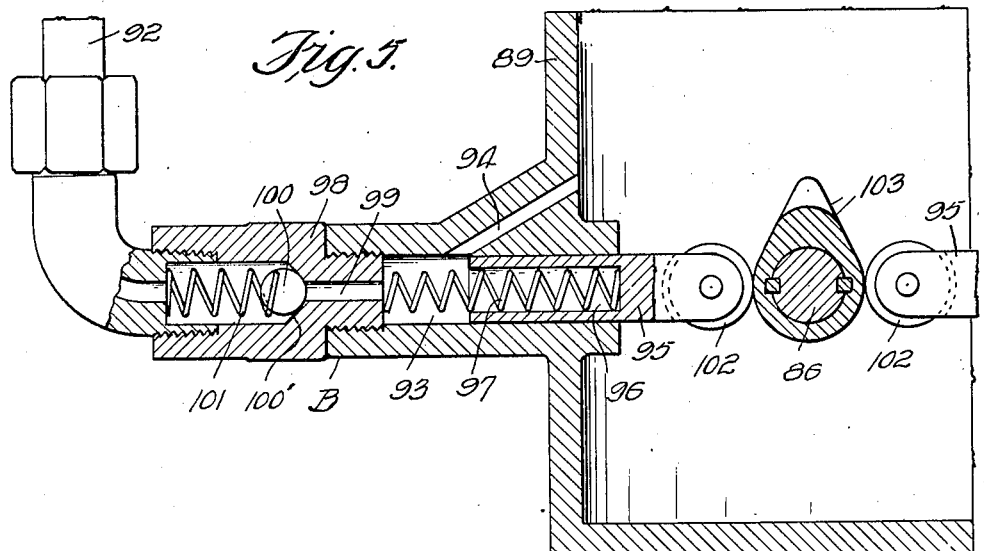
Fig. 5 is an enlarged sectional view through the motive fluid supply tank and one of the jet pumps.
Figure 6:
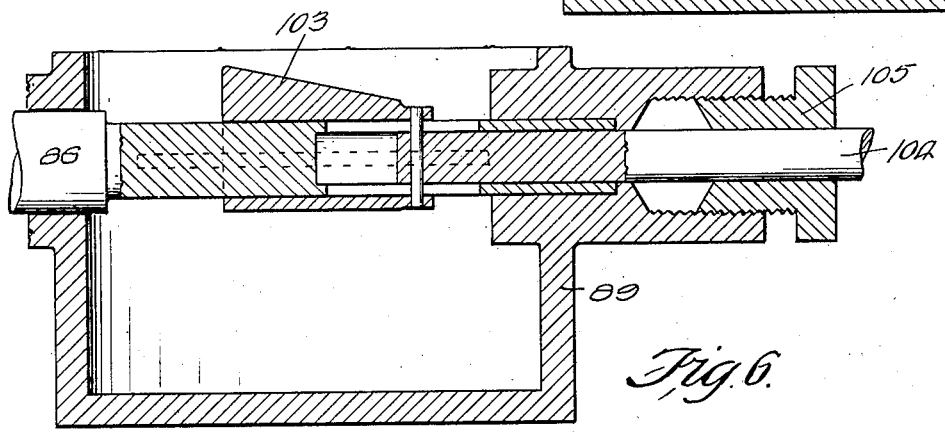
Fig. 6 is an enlarged sectional view of the slidably adjustable cam for actuating the jet pumps.
Figure 7:
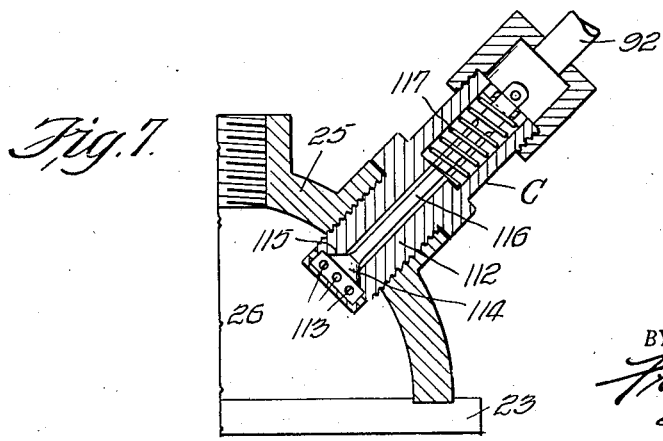
Fig. 7 is a view in sectional elevation of the motive fuel spray nozzle.

The mechanism for supplying the motive fuel from the fuel supply tank 89 to the combustion chamber 26 of each power unit, comprises a conduit 92 which is connected at its lower end with a fuel pump designated generally by the reference character B and at its upper end with a spray nozzle designated generally by the reference character C, shown in Figs. 3 and 5.

Each jet pump B comprises a casing having a chamber 93 communicating with the interior of the motive fluid tank 89 by means of a by-pass 94 for admitting liquid fuel by gravity from the tank to the jet pump chamber 93. A piston 95 is workable within the cylindrical chamber 93 and the inner end of the piston is bored out as at 96 to receive one end of a coiled expansion spring 97, which spring at its outer end engages a coupling 98 having a passage 99. The coupling 98 is provided with a check valve in the form of a ball 100 which is held against a valve seat 100' at the outer end of passage 99 by means of a coiled spring 101. The inner end of the piston 95 extends into the tank 89 and is provided with a roller 102 which engages a suitable cam 103 slidably supported upon the cam shaft 86 and movable longitudinally of the cam shaft by means of a shaft 104 which passes through a suitable bearing 105 and which is actuated in and out for changing the position of the cam 103 relative to the piston rollers 102 by means of a lever 106 pivoted as at 107 to a bracket 108 carried by the fuel supply tank 89. The lever 106 carries a dog 109 at the end of a plunger rod 110 and is adapted to engage the teeth of a suitable sector 111 for holding the rod 110 and the pump cam 103 in predetermined relation with the piston rollers 102 so as to control the amount of motive fluid pumped into the conduits 92 for delivery to the combustion chambers 26.

The jet or spray nozzle C for admitting the motive fluid under pressure to each combustion chamber 26 comprises a plug 112 for each combustion chamber having screw threaded connection with each dome shaped head 25. Each nozzle is provided at its inner end with a plurality of fluid spray outlet openings 113 and is also provided with a valve 114 engaging a seat 115, and the valve is provided with a longitudinally grooved valve stem 116 encircled by means of a coiled expansion spring 117 for normally holding the valve 114 in its closed position to be opened only under pressure of the motive fluid forced to its respective combustion chamber 26 by action of the jet pumps B.

The rotor 58 is revolvable in a facial recess 1' formed in the outer face of the end wall 1 of the casing A, which wall is provided with a flange 117' that is adapted to be connected with a flange 118 carried at the inner end of the exhaust casing 65 by means of suitable fastening devices 119.

The inner end of the exhaust casing 65 is provided with a circular opening 120 adapted to receive the ported partition 60 clamped in position by the casing flange 118 and flange 117'. The inner end portion of the exhaust casing 65 and the flanged portion of the casing wall 1 act to provide a housing for the rotors 58 and 62 and the ported partition 60 therebetween, as will be apparent from Fig. 3.

In operation, the air pumps in their turn, take in a charge of fresh air and compress the same. The air compressed by the pumps is discharged into their respective combustion chambers 26 and subsequent thereto liquid motive fuel is forced by the jet pumps B into the respective combustion chambers 26 under predetermined pressure so as to enter the combustion chambers 26 as a spray from the nozzles C. After the motive fuel has been sprayed into the combustion chambers 26 already supplied with compressed air, the combustible gaseous mixture is ignited by a suitable electrode 121 and the force of the explosion therein is liberated from the combustion chamber 26 of either power unit through the valve controlled passages 50, 53, 54 and 55 and directed tangentially first against the blades of rotor 58 and then as they expand are directed through passages 59 in the rotor partition 60 and are finally directed tangentially against the blades of the second rotor 62 from the blades of which rotor the finally expanded burnt gases escape into the chamber 63 of the exhaust casing 65 to be finally liberated through the exhaust opening 64 of the casing.

To prevent burning of that portion of the power shaft 5 which passes through the exhaust casing 65, I provide a suitable protective sleeve 122 for the shaft 5, as shown in Fig. 1.

The force of the explosion in either combustion chamber 26, if greater than a predetermined pressure for which the automatic pressure relief valve 68 are adjusted will lift the automatic valve 68 prior to the opening of the cam actuated valve 78, thus permitting the force of the exploded gases to be liberated from the combustion chamber first through passage 53 controlled by the automatic valve 68 and later when the pressure has been reduced through passage 54 controlled by the cam opened valve 78. The exploded gases thus liberated from the combustion chamber through the passages 53 and 54 are finally directed through the jet passages 55 for impact with the bladed rotors to revolve the rotors for rotating the power or drive shaft 5.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention may be made without conflicting or departing from the spirit of the invention within the scope of the appended claims.

What I claim is:

1. In an engine structure, in combination a pair of upright air compressors, a horizontally disposed power shaft from which said compressors are actuated, a pair of peripherally bladed rotors fixed to said shaft, a fixed ported partition between said rotors, a combustion chamber disposed above each compressor, a head member between each compressor and its respective combustion chamber, an air intake valve in said head member for each compressor, a valve for controlling the discharge of air from the compressors into the combustion chambers, means for admitting motive fuel under pressure into the combustion chambers subsequent to the discharge of compressed air into the combustion chambers from the compressors and at a greater pressure than the air pressure, means for regulating the amount of motive fuel delivered to the combustion chambers, means for igniting the fuel mixture in the combustion chambers, said head member having a combustion passage therein leading from each combustion chamber and merging with a branched pressure delivery passage which communicates with the blades of the rotors, opposed valves controlling communication between the combustion passage and the branched pressure delivery passages, one of said valves being an automatic pressure relief valve and the other valve being a mechanically opened valve for permitting burnt expanded gases to be discharged into the branched pressure delivery passage and against the bladed rotors for rotating the rotors by impact of the exploded gases liberated from the combustion chambers and said head member having an air storage chamber disposed between each compressor and its respective combustion chamber to trap a quantity of air under pressure as either combustion chamber is being charged with air, and a valve actuated by the air pressure trapped in either storage chamber when the pressure of burnt gases recedes in either combustion chamber to allow the trapped air to rush into the combustion chamber discharging its burnt gases for the purpose of scavenging the same.

2. An engine of the class described, in combination, a turbine shaft running longitudinally of the engine, a crank shaft disposed at a right angle thereto, means for driving the crank shaft from the turbine shaft, an upright cylinder disposed on opposite sides of the turbine shaft, a piston in each cylinder, means connecting each piston with the crank shaft, a head for each cylinder, an air inlet for each cylinder, a combustion chamber disposed above the head of each cylinder, an air outlet for each cylinder communicating with its respective combustion chamber, means for supplying fuel to each combustion chamber at predetermined intervals after the air has been admitted thereto and at a higher pressure than the air so admitted, means for igniting the combustible mixture in each cylinder, a ported stator concentric with the turbine shaft, an inner and an outer turbine bladed rotor fixed to the turbine shaft and disposed on opposite sides of the ported stator, an exhaust receiving casing having an exhaust outlet surrounding the stator and rotors including part of the turbine shaft, a passage leading from each combustion chamber, a pair of valve controlled passages communicating therewith and a multiple nozzled passage communicating at one end with the valve controlled passages and at the opposite end with a plurality of the blades of the inner rotor.

3. An engine of the class described, in combination, a turbine shaft running longitudinally of the engine, a crank shaft disposed at a right angle thereto, means for driving the crank shaft from the turbine shaft, an upright cylinder disposed on opposite sides of the turbine shaft, a piston in each cylinder, means connecting each piston with the crank shaft, a head for each cylinder, an air inlet for each cylinder, a combustion chamber disposed above the head of each cylinder, an air outlet for each cylinder communicating with its respective combustion chamber, means for supplying fuel to each combustion chamber at predetermined intervals after the air has been admitted thereto and at a higher pressure than the air so admitted, means for igniting the combustible mixture in each cylinder, a ported stator concentric with the turbine shaft, an inner and an outer turbine bladed rotor fixed to the turbine shaft and disposed on opposite sides of the ported stator, an exhaust receiving casing having an exhaust outlet surrounding the stator and rotors including part of the turbine shaft, a passage leading from each combustion chamber, a pair of valve controlled passages communicating therewith, a multiple nozzled passage communicating at one end with the valve controlled passages and at the opposite end with a plurality of the blades of the inner rotor and means for trapping and retaining a quantity of air under pressure at the same time air is delivered from the cylinders to their respective combustion chambers for delivery to the combustion chambers when the exploded mixture therein has receded in pressure to a point below that of the trapped air for the purpose of scavenging the combustion chambers after each explosion therein.

4. In a combustion rotary engine, the combination with a ported stator, a rotor cooperating with either side therewith and fixed to a turbine shaft on opposite side of the ported stator, turbine vanes on said rotors with the vanes of one rotor being spaced further apart than on the other, a pair of combustion chambers, a vertically disposed reciprocating piston type air pump disposed directly below each combustion chamber on opposite sides of the turbine shaft and in communication with its respective combustion chamber through a chambered outlet for admitting air thereto under predetermined pressure, means for admitting fuel under higher pressure than the air pressure to its respective combustion chamber, a spring closed valve in the lower end of said outlet and an air pressure opened valve at its upper end, a valve controlled passage by means of which the exploded mixture within either combustion chamber is directed against the vanes of the one rotor, then through the ported stator and finally against the second rotor, and said outlet serving to trap a supply of air under pressure which will open the valve at the upper end thereof when explosion pressure in the combustion chamber has receded in exhausting therefrom toward the rotors for admitting the trapped air in the outlet between each air pump and its respective combustion chamber for scavenging the combustion chambers of its lingering burnt gases after each explosion in the combustion chambers.

5. In an engine of the class described, in combination, a base including a crank case, a pair of upright cylinders, a piston workable in each cylinder, a head for said cylinders, a housing on said head for each cylinder to provide a combustion chamber directly above each cylinder, a valve controlled air inlet in said head for each cylinder, a chambered air outlet in said head for each cylinder communicating at opposite ends with the cylinders and with the combustion chambers, opposed valves in each air outlet of the head, the lowermost of said opposed valves being spring closed and the uppermost valve being pressure closed and connected so that the uppermost valve can be lifted without lifting the lowermost valve, but the uppermost valve lifted whenever the lowermost valve is lifted, said chambered air outlet passages serving as traps for retaining a quantity of air under pressure to be admitted to their respective combustion chambers for scavenging the combustion chambers after an explosion in either combustion chamber has taken place and the pressure therein receded to a point below that of the trapped air, means for admitting fuel under pressure into the combustion chambers above that of the compressed air admitted thereto from the cylinders, means for igniting the mixture of air and fuel within the combustion chambers and valve controlled passages for directing the force of an explosion in either combustion chamber toward and against the bladed rotors for propelling the rotors and imparting rotary motion to the shaft to which the rotors are fixed.

6. In combination with an engine having a combustion chamber and a plurality of bladed rotors fixed to a drive shaft, an air pressure generating chamber having a valve controlled air inlet and a chambered outlet connecting the air generating chamber with the combustion chamber of the engine, a pair of opposed valves controlling the outlet both of which are opened simultaneously in admitting air under a predetermined pressure from the air pressure generating chamber to the combustion chamber and both valves closed together when the combustion chamber has been charged, thus trapping a quantity of air in the chambered outlet of equal pressure to that in the combustion chamber, means for admitting fuel in the form of a spray into the air filled combustion chamber at a pressure greater than the air pressure therein, means for igniting the fuel within the combustion chamber to create an explosion therein, a spring pressed control valve and a time controlled valve for controlling a passage for directing the force of the explosion from the combustion chamber toward and against the bladed rotors to impart motion thereto and the uppermost of the aforesaid valves in the outlet connecting the air pressure generating chamber with the combustion chamber operable independent of the lowermost opposed valve when the pressure has receded to a point below that of the air trapped in the chambered outlet for admitting the trapped air in the chambered outlet into the combustion chamber for the purpose of scavenging the combustion chamber prior to being charged with air and fuel from separate sources to be ignited.

In testimony whereof, I have hereunto affixed my signature.

OTTO LARSON.